United States Patent Office 2,861,759
Patented Nov. 25, 1958

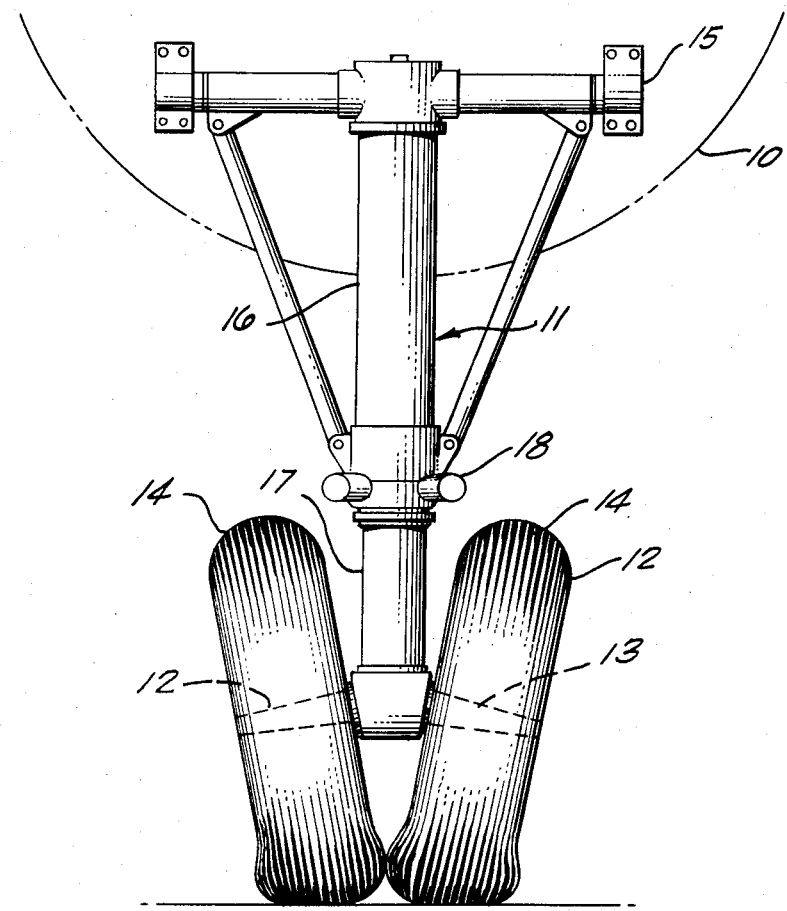

2,861,759

ANTI-SHIMMY NOSE WHEEL

Fred A. Wright, Pacific Palisades, Calif., assignor to Douglas Aircraft Company, Inc., Santa Monica, Calif.

Application July 23, 1954, Serial No. 445,223

3 Claims. (Cl. 244—103)

This invention relates to wheels and more particularly to means to mount dual wheels.

In mounting dual wheels on a vehicle, particularly an aircraft having a tricycle type landing gear with a castering dual wheel assembly mounted forward of the aircraft center of gravity, certain problems have arisen.

It has been found that when dual units are keyed together to rotate as a unit, in order to prevent shimmy effects, steering during ground operation is difficult because of the tendency of the dual wheels to resist deviation from a straight line. Furthermore, excessive wear results from the fact that one or both of the wheels must drag on the ground when making a turn. In an attempt to alleviate these conditions, there have been provided clutch elements of various types which restrain the wheels against shimmy but which release automaticaly or under pilot control to permit the wheels to rotate independently when desired. While such devices generally permit a satisfactory use of dual wheels, a great amount of excess weight and complication is added.

When dual wheels are mounted so that they may rotate at all times freely relative to each other there is a tendency for them to shimmy or oscillate with the result that it is difficult to control the vehicle, particularly at high speeds. Various damping arrangements have been attempted to avoid such an occurance, but have solved this problem by creating another problem of added weight and bulk.

The present invention provides a simple and lightweight means for damping such oscillations of the dual wheels while at the same time enabling them to rotate relatively to each other, thereby eliminating excessive steering loads and scrubbing of one or both of the wheels on the ground when making a turn. This is accomplished without the use of any additional or supplemental damping or clutching equipment.

To this end, this invention contemplates the use of separate stub axles mounted on opposite sides of a supporting or suspension member. The axles are inclined so that the wheels mounted thereon contact each other near the portions of the wheels which are in ground contact. Thus for one wheel or both wheels to oscillate it would be necessary for one wheel to rotate at a different angular velocity than the other wheel thereby causing the wheels to move relatively along each other which they are prevented from doing by their mutual contact.

By varying the angle of axle tilt, tire size, tire inflation and mounting, various pressures and areas of contact between the two wheels can be obtained. When these factors are in proper balance there is sufficient pressure between the wheels to damp oscillation about a vertical axis, but not enough to prevent relative rotation of the wheels about their axles in the case of the vehicle making a turn. When this turning happens the wheels will rub over each other in their contact region, which rubbing will not seriously affect steering ease nor cause either wheel to drag on the ground.

These and other features and advantages of the invention will be apparent from the following description taken in connection with the accompanying drawing in which the figure shows a front view of a typical installation of the invention on a vehicle such as an aircraft.

The fuselage or body of a vehicle 10 has suspended from it a supporting member 11, here shown as a hydraulic shock-strut unit, on which are mounted the downwardly inclined axles 12 and 13. Each axle supports a wheel 14 which may rotate about the axle or be attached to the axle whereby the axle will rotate in the supporting member 11. Member 11, which may be attached to the vehicle by any suitable means, is herein shown attached by a hinge 15 which permits the entire dual wheel assembly to fold into the vehicle body if necessary.

While other forms of yieldable suspension and steering controls may be used, the type shown herein is common to most aircraft. The supporting member 11 consists of two parts, the casing 16 and a plunger 17 which is telescopically received in the casing for springing action. The wheels are rotated for steering by action of transfer mechanism 18 on the plunger 17 to rotate it about its longitudinal axis. Mechanism 18 consists of single-acting hydraulic motors, each connected to an arm (not shown) projecting radially from peripherally spaced loci on the plunger 17, each unit 18 being under the control of the pilot through control means (not shown) to alternately act in such manner as to torque the plunger 17 alternately in opposite directions for steering right and left.

In order to calculate the proper wheel mounting dimensions and angle of axle inclination, it is necessary to know the weight of the vehicle and the size wheels to be used. Assuming a proper tire inflation, from this information the amount of tire spread across the tire body near the area of ground contact can be ascertained. By varying the angle of axle inclination and the distance between the wheels at the axle mounting area, the necessary mutual contact area between the two wheels may be obtained. It is to be understood that many combinations will be satisfactory. The greater the separation of the wheels at the axles, the more severe will be the angle of inclination of the axles, the critical factor to be maintained being the amount of contact area of the wheels with each other which will control the amount of force necessary to rotate one wheel relative to the other about its axle.

By proper integration of these variable factors, the resulting mutual contact area of the wheels will produce sufficient friction to resist relative rotation of the wheels about their axles, thereby eliminating oscillation but not enough to prevent relative rotation about their axles for the purpose of turning the vehicle without dragging either wheel on the ground.

There is some leeway to be permitted in the amount of wheel contact since an oscillation occurs first as a very small force which quickly builds up in magnitude. Thus, to prevent such as oscillation from building up a small amount of friction between the wheels will damp out this initially small force at its inception. Since the amount of contact area of the wheels with the ground and resulting force normal to the ground exceeds the mutual contact area of the wheels with each other and resulting force between the wheels at their mutual contact portion, the wheels will have a friction relative to the ground greater than the friction relative to each other. Accordingly, when it is desired to turn, both wheels will remain in steady contact with the ground and will instead slip on each other in the area of contact.

It can be seen that this invention provides a simple, foolproof, and light dual wheel installation which accomplishes oscillation damping and permits easy steering with the associated long tire wear without resorting to any of the additional equipment formerly believed necessary.

Although the now preferred embodiment of the invention has been shown and described herein, it is to be understood that the invention is not to be limited thereto, for the invention is susceptible to changes in form and detail within the scope of the appended claims.

I claim:

1. An anti-shimmy dual wheel castering landing gear unit for aircraft comprising: a supporting member carried by the aircraft and mounted for rotation about the vertical axis of said member; a pair of axles extending outwardly from opposite sides of said supporting member, and a ground-engaging wheel rotatably mounted on each of said axles; said axles being inclined toward the ground sufficiently to establish mutual contact of the lower portion of the sides of said wheels when the latter contact the ground thereby to inhibit oscillations of said castering unit about its vertical axis in running on the ground.

2. An anti-shimmy dual wheel castering landing gear unit for aircraft comprising: a supporting member carried by the aircraft and mounted for rotation about the vertical axis of said member; ground-wheel supporting axles extending outwardly from opposite sides of said member; a ground engaging wheel rotatably mounted on each of said axles; said axles being downwardly inclined below the horizontal by an angle substantially greater than that necessary to establish effective camber of the wheels whereby the lower portions of the inner side walls of said wheels are in mutual contact when said wheels engage the ground, thereby to inhibit oscillations of said castering unit about its vertical axis when running on the ground.

3. An anti-shimmy dual wheel castering landing gear unit for aircraft comprising: a supporting member carried by the aircraft and mounted for rotation about the vertical axis of said member; ground wheel supporting axles extending outwardly from opposite sides of said member; said axles being downwardly inclined below the horizontal by an amount sufficient to establish an included angle between said axles that is smaller than that of the included angle between said axles at which effective camber of the ground wheels is established; a ground engaging wheel rotatably mounted on each of said axles so that the mutually adjacent faces of said wheels frictionally contact sufficiently when the wheels engage the ground to inhibit oscillations of said castering unit about its vertical axis.

References Cited in the file of this patent

UNITED STATES PATENTS

| | | |
|---|---|---|
| 2,069,994 | Butler | Feb. 9, 1937 |
| 2,301,152 | Strehlow | Nov. 3, 1942 |
| 2,402,428 | Mitten | June 18, 1946 |
| 2,620,235 | Butler | Dec. 2, 1952 |

OTHER REFERENCES

Commercial Car Journal, November 1952, p. 109, 280–87–x.